United States Patent
Tsukamoto et al.

(10) Patent No.: US 11,521,049 B2
(45) Date of Patent: Dec. 6, 2022

(54) OPTIMIZATION DEVICE AND CONTROL METHOD OF OPTIMIZATION DEVICE

(71) Applicant: FUJITSU LIMITED, Kawasaki (JP)

(72) Inventors: Sanroku Tsukamoto, Setagaya (JP); Satoshi Matsubara, Machida (JP)

(73) Assignee: FUJITSU LIMITED, Kawasaki (JP)

(*) Notice: Subject to any disclaimer, the term of this patent is extended or adjusted under 35 U.S.C. 154(b) by 594 days.

(21) Appl. No.: 16/584,994

(22) Filed: Sep. 27, 2019

(65) Prior Publication Data

US 2020/0167635 A1    May 28, 2020

(30) Foreign Application Priority Data

Nov. 27, 2018  (JP) .............................. JP2018-221358

(51) Int. Cl.
  *G06N 3/063*  (2006.01)
  *G06N 3/08*  (2006.01)
  *G06F 7/58*  (2006.01)

(52) U.S. Cl.
  CPC .............. *G06N 3/063* (2013.01); *G06N 3/08* (2013.01); *G06F 7/588* (2013.01)

(58) Field of Classification Search
  CPC . G06N 3/08; G06N 3/063; G06N 3/04; G06F 7/588
  See application file for complete search history.

(56) References Cited

U.S. PATENT DOCUMENTS

2018/0018563 A1   1/2018  Tsukamoto et al.

FOREIGN PATENT DOCUMENTS

JP    H07-191951 A    7/1995
JP    H08-22446 A     1/1996

OTHER PUBLICATIONS

Matsubara, S. et al., "Ising-Model Optimizer with Parallel-Trial Bit-Sieve Engine", Jul. 5, 2017 In: Barolli, L., Terzo, O. (eds) Complex, Intelligent, and Software Intensive Systems. CISIS 2017. Advances in Intelligent Systems and Computing, vol. 611. Springer, Cham. (Year: 2017).*
Tsukamoto et al., "An Accelerator Architecture for Combinatorial Optimization Problems", Sep. 2017 (Year: 2017).*
Vatankhahghadim, Behraz, "A Fully-Connected Boltzmann Machine with Virtual FPGAs", Jun. 2018 (Year: 2018).*

(Continued)

*Primary Examiner* — Kamran Afshar
*Assistant Examiner* — Brian J Hales
(74) *Attorney, Agent, or Firm* — Fujitsu Patent Center

(57) ABSTRACT

An optimization device includes: processing circuits each configured to: hold a first value of a neuron of an Ising model; and perform a process to determine whether to permit updating of the first value based on information of the Ising model and information about a target neuron; a control circuit configured to: set, while causing a portion of the processing circuits to perform the process for a partial neuron group, information to be used for the process for a first neuron other than the partial neuron group in a first processing circuit; cause a second processing circuit among the portion of the processing circuits to inactivate the process; and cause the first processing circuit to start the process for the first neuron; and an update neuron selection circuit configured to: select the target neuron from one or more update permissible neurons; and update the value of the target neuron.

8 Claims, 10 Drawing Sheets

(56) References Cited

OTHER PUBLICATIONS

European Office Action dated Oct. 22, 2021 for corresponding European Patent Application No. 19199500.0, 8 pages. \*\*\*Please note D1 "Behraz Vatankhahghadim et al: "A Fully-Connected Boltzmann Machine with Virtual FPGAs", Jul. 1, 2018 . . . ".
Vatankhahghadim, Behraz et al., "A Fully-Connected Boltzmann Machine with Virtual FPGAs", Jul. 1, 2018 XP055682916, Retrieved from the Internet:URL:https://tspace.library.utoronto.ca/bitstream/1807/95632/3/Vatankhahghadim_Behraz_201806_MAS_thesis.pdf [retrieved on Apr. 3, 2020], pp. 1-68.
Tsukamoto, Sanroku et al., "An Accelerator Architecture for Combinatorial Optimization Problems", Fujitsu Scientific & Technical Journal(FSTJ), vol. 53, No. 5, Sep. 1, 2017, pp. 8-13, XP055673462.
Extended European Search Report dated Apr. 22, 2020 for corresponding European Patent Application No. 19199500.0, 11 pages.
Chinese Office Action dated Apr. 21, 2022 for corresponding Chinese Patent Application No. 201910988535.7, with English Translation, 19 pages. \*\*\*Please note NPL Vatankhahghadim, Behraz et al., "A Fully-Connected Boltzmann Machine with Virtual FPGA's".

\* cited by examiner

FIG. 1
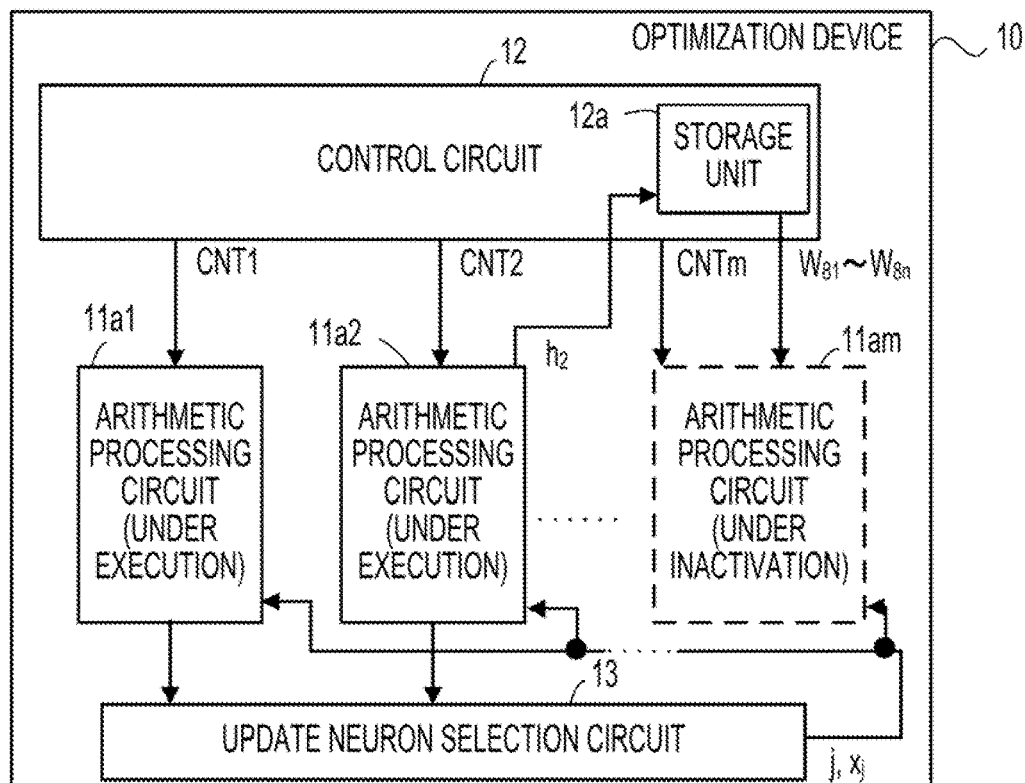
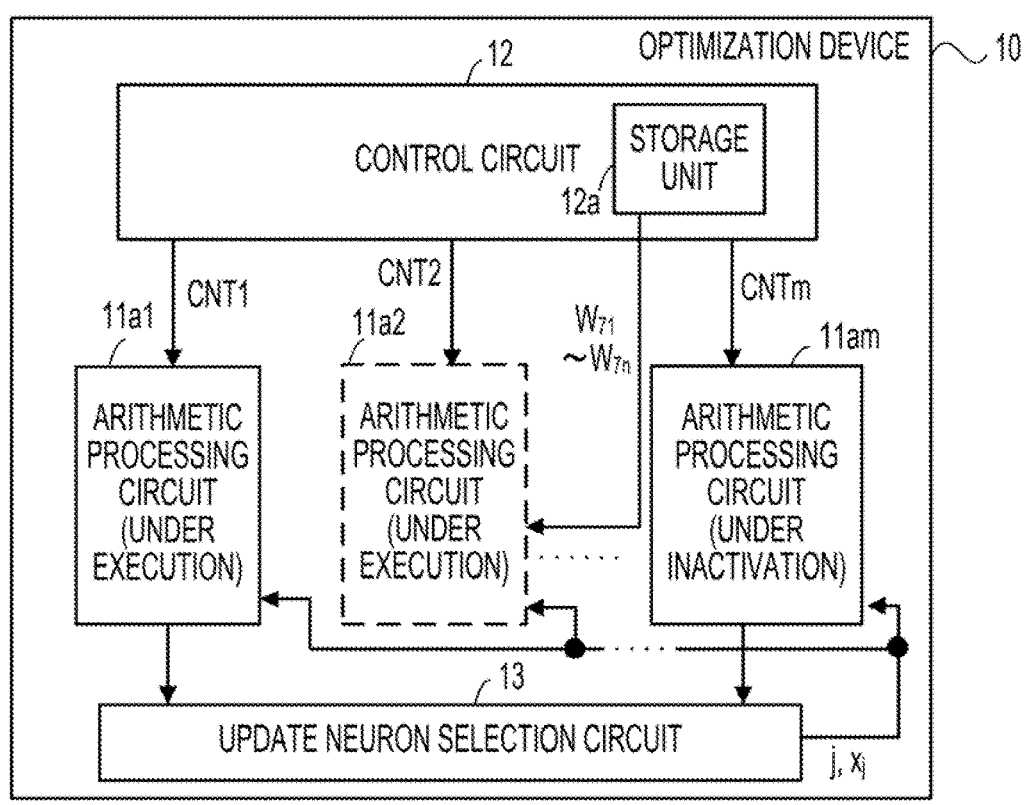

FIG. 7

| | NEURON A | NEURON M | NEURON K | CONTROL SIGNAL MADE ACTIVE | | | | |
|---|---|---|---|---|---|---|---|---|
| | | | | $CN_i$ | $CW_j$ | $CS_i$ | $EX_i$ | $OE_i$ |
| OPERATION STATE a | ITERATION OPERATION | ITERATION OPERATION | INACTIVATION | $CN_A$, $CN_M$ | | | $EX_A$, $EX_M$ | |
| OPERATION STATE b | ITERATION OPERATION $W_j^{(A,K)}$ SETTING | ITERATION OPERATION | $x^{(K)}, h_K, W_j^{(K)}$ SETTING | $CN_A$, $CN_M$ | $CW_j^{(K)}$, $CW_j^{(A,K)}$ | $CS_K$ | $EX_A$, $EX_M$ | |
| OPERATION STATE c | ITERATION OPERATION | ITERATION OPERATION | LOCAL FIELD UPDATING | $CN_A$, $CN_M$ | | | $EX_A$, $EX_M$ | |
| OPERATION STATE d | ITERATION OPERATION | ITERATION OPERATION, STORE $x^{(M)}$ AND $h_M$ | LOCAL FIELD UPDATING | $CN_A$, $CN_M$ | | | $EX_A$, $EX_M$ | $OE_M$ |
| OPERATION STATE e | ITERATION OPERATION | INACTIVATION | ITERATION OPERATION | $CN_A$, $CN_K$ | | | $EX_A$, $EX_K$ | |

OPTIMIZATION DEVICE AND CONTROL METHOD OF OPTIMIZATION DEVICE

CROSS-REFERENCE TO RELATED APPLICATION

This application is based upon and claims the benefit of the prior Japanese Patent Application No. 2018-221358, filed on Nov. 27, 2018, the entire contents of which are incorporated herein by reference.

FIELD

The embodiments discussed herein are related to an optimization device and a control method of the optimization device.

BACKGROUND

As a method for solving a multivariable optimization problem at which a Neumann-type computer is not effective, there is an optimization device using an Ising-type energy function (sometimes called an Ising machine or a Boltzmann machine). The optimization device replaces a problem to be calculated with an Ising model which represents the behavior of a spin of a magnetic substance, and then calculates the problem.

The optimization device may model the problem using, for example, a neural network. In that case, each of a plurality of units (neurons) included in the optimization device and coupled to each other functions as a neuron that outputs 0 or 1 according to a state variable (bit) representing the state of another neuron and a weighting factor (also referred to as a coupling factor) indicating the strength of coupling between a state variable (bit) of its own neuron and the state variable (bit) of the another neuron. For example, the optimization device uses a stochastic search method such as simulated annealing to obtain, as a solution, a combination of states of bits that can obtain the minimum value of the Ising-type energy function (also referred to as a cost function or an objective function).

In addition, as an example of neural network technology, there is a technology that connects a plurality of neural network circuits to extend the network scale. Further, as another example, there is a technology that stores connection information of a neural network in a storage device and rewrites the connection information to change the connection state of the neural network so as to implement a variety of neural networks from a small-scale neural network to a large-scale neural network.

Related techniques are disclosed in, for example, Japanese Laid-open Patent Publication No. 07-191951 and Japanese Laid-open Patent Publication No. 08-022446.

When an optimization device that performs a number of iterative calculations using a stochastic search method is implemented in hardware, there is a problem that the amount of hardware increases as the scale of an optimization problem becomes larger (the number of neurons increases).

SUMMARY

According to an aspect of the embodiments, an optimization device includes: arithmetic processing circuits each configured to: hold a first value of a neuron for which an arithmetic process is to be performed, the neuron being one of neurons of an Ising model obtained by converting an optimization problem of a calculation target; and perform the arithmetic process to determine whether to permit updating of the first value based on information of the Ising model and information about a target neuron, the number of the arithmetic processing circuits being smaller than the number of the neurons; a control circuit configured to: set, while causing a portion of the arithmetic processing circuits to perform the arithmetic process for a partial neuron group that is a portion of the neurons, information to be used for the arithmetic process for a first neuron among neurons other than the partial neuron group in a first arithmetic processing circuit among the arithmetic processing circuits, the arithmetic process of the first arithmetic processing circuit being inactivated; cause a second arithmetic processing circuit among the portion of the arithmetic processing circuits to inactivate the arithmetic process; and cause the first arithmetic processing circuit to start the arithmetic process for the first neuron; and an update neuron selection circuit configured to: select the target neuron from one or more update permissible neurons among the partial neuron group, the one or more update permissible neurons being determined to be permitted to be updated; and update the value of the target neuron among values of neurons held by the portion of the arithmetic processing circuits.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 1 is a view illustrating an example of an optimization device according to a first embodiment;

FIG. 7 is a view illustrating an example of a relationship between the operation state of each neuron during a replacement process and a control signal made active;

DESCRIPTION OF EMBODIMENTS

Figure 2:
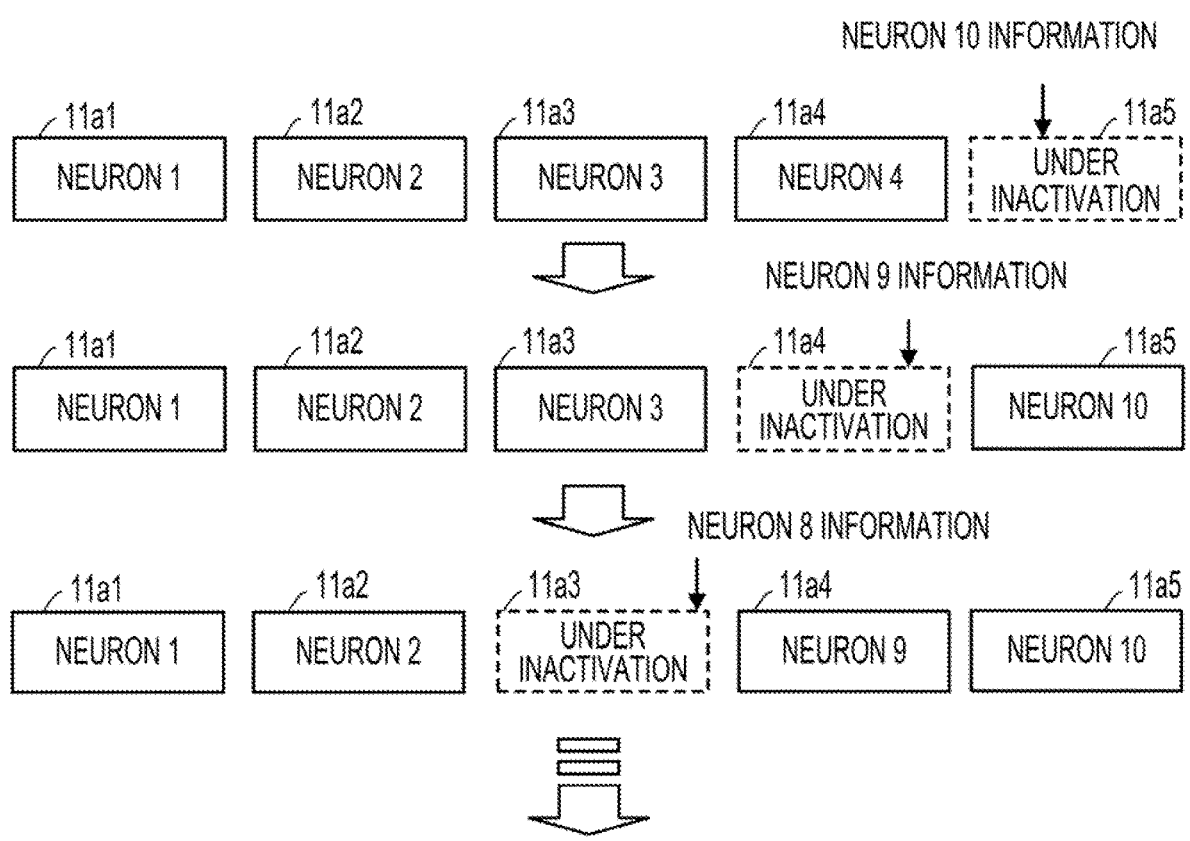
FIG. 2 is a view illustrating an example of replacement of neurons to be processed.

Hereinafter, embodiments of the present disclosure will be described with reference to the accompanying drawings.

An optimization device described herein below searches for a bit value of each neuron (the ground state of an Ising model) when an energy function has the minimum value, among the combinations of each value of a plurality of neurons (hereinafter, referred to as "bit values") of an Ising model obtained by converting an optimization problem of a calculation target.

An Ising-type energy function E(x) is defined, for example, by the following equation (1).

(Equation 1)

$$E(x) = -\sum_{\langle i,j \rangle} W_{ij}x_i x_j - \sum_i b_i x_i \qquad (1)$$

The first item on the right side is an integration of the product of bit values (0 or 1) of two neurons and a weighting factor, for all combinations of entire neurons, without omission and duplication. The symbol $x_i$ is a variable (also referred to as a state variable) that represents a bit value of a neuron having "i" as identification information (hereinafter, referred to as an index), and the symbol $x_j$ is a variable that represents a bit value of a neuron of an index=j. The symbol $W_{ij}$ is a weighting factor that represents the magnitude of interaction between neurons of index=i and j. In addition, $W_{ii}$=zero (0). In addition, in many cases, $W_{ij}=W_{ji}$ (that is, a factor matrix by a weighting factor is often a symmetric matrix). Further, the weighting factor $W_{ij}$ has a predetermined bit width (e.g., 16 bits, 32 bits, 64 bits, 128 bits, etc.).

The second item on the right side is a total sum of the product of a bias factor of each of entire neurons and a bit value of the neuron. The symbol $b_i$ represents a bias factor of a neuron with an index=i.

In addition, when $x_i$ changes to $1-x_i$, the increment of $x_i$ may be expressed as $\Delta x_i=(1-x_i)-x_i=1-2x_i$. The energy change $\Delta E_i$ accompanied by the spin inversion (change in bit value of a neuron) is expressed by the following equation (2).

(Equation 2)

$$\Delta E_i = E(x)|_{x_i \to 1-x_i} - E(x) = -\Delta x_i \left( \sum_j W_{ij}x_j + b_i \right) = -\Delta x_i h_i \qquad (2)$$

In the equation (2), $\Delta x_i$ becomes −1 when $x_i$ changes from 1 to 0, and becomes 1 when $x_i$ changes from 0 to 1. In addition, the symbol $h_i$ is called a local field, and $\Delta E_i$ is obtained by multiplying $h_i$ by a sign (+1 or −1) according to $\Delta x_i$. That is, $h_i$ indicates the magnitude of the energy change $\Delta E_i$. When $h_i$ is less than 0, the total energy decreases by updating $x_i$ from 1 to 0, and when $h_i$ is greater than 0, the total energy decreases by updating $x_i$ from 0 to 1.

In addition, the change amount $\Delta h_i$ of $h_i$ when $x_j$ changes from 0 to 1 may be expressed as $+W_{ij}$, and $\Delta h_i$ when $x_j$ changes from 1 to 0 may be expressed as $-W_{ij}$. Therefore, $h_i$ may be updated by adding or subtracting $W_{ij}$ to or from the original $h_i$ depending on whether a bit value of a neuron updated with a state transition is 1 or 0.

First Embodiment

FIG. 1 is a view illustrating an example of an optimization device according to a first embodiment.

An optimization device 10 according to the first embodiment includes arithmetic processing circuits 11a1, 11a2, ..., 11am, a control circuit 12, and an update neuron selection circuit 13.

Each of the arithmetic processing circuits 11a1 to 11am holds a bit value of each of a plurality of neurons. Further, each of the arithmetic processing circuits 11a1 to 11am performs an arithmetic process to determine whether to permit updating of a bit value of a neuron, based on Ising model information and update target information about an update target neuron supplied from the update neuron selection circuit 13. For example, each of the arithmetic processing circuits 11a1 to 11am first calculates a local field based on the Ising model information and the update target information. The Ising model information includes the weighting factor described above. The update target information includes a bit value and an index of the update target neuron. The local field is updated by adding or subtracting a weighting factor indicating the magnitude of interaction between a neuron processed by each of the arithmetic processing circuits 11a1 to 11am and the update target neuron to or from a previous value, according to whether the bit value of the update target neuron is 1 or 0. Therefore, the calculation of the local field may be implemented by using a circuit that performs the addition or subtraction. In addition, each of the arithmetic processing circuits 11a1 to 11am may calculate the energy change itself based on the equation (2).

Then, each of the arithmetic processing circuits 11a1 to 11am determines whether to permit updating of a bit value of a neuron, based on a temperature parameter, a thermal noise determined based on a random number, a local field, and the bit value of the neuron held. The temperature parameter is input from the control circuit 12.

As described above, when $h_i$ for a neuron with index=i is smaller than 0 and $x_i$ is 1, the total energy decreases by updating $x_i$ from 1 to 0. In addition, when $h_i$ is greater than 0 and $x_i$ is 0, the total energy decreases by updating $x_i$ from 0 to 1. Meanwhile, when $h_i$ is smaller than 0 and $x_i$ is 0, the total energy increases by updating $x_i$ from 0 to 1. In addition, when $h_i$ is greater than 0 and $x_i$ is 1, the total energy increases by updating $x_i$ from 1 to 0.

In order to prevent the state of the Ising model from being trapped by a local solution that is not the ground state (optimal solution), the arithmetic processing circuits 11a1 to 11am use a thermal noise to generate a state transition in which energy increases, at a predetermined probability.

The width of the thermal noise increases as the temperature parameter becomes larger. When a simulated annealing is performed, the temperature parameter is controlled by the control circuit 12 so as to be gradually small.

The determination process described above is implemented by a circuit that generates a thermal noise using a random number generator such as LFSR (Linear Feedback Shift Registers), a comparison circuit or the like. Each of the arithmetic processing circuits 11a1 to 11am iterates the arithmetic process including the above process.

In addition, the number of arithmetic processing circuits 11a1 to 11am is smaller than the total number of neurons. For this reason, a neuron on which the arithmetic process is performed is replaced by the control circuit 12 to be described later.

The arithmetic processing circuits 11a1 to 11am are included in, for example, a single-chip or multiple-chip semiconductor integrated circuit (ASIC (Application Specific Integrated Circuit), FPGA (Field-Programmable Gate Array), or the like).

The control circuit 12 outputs control signals CNT1, CNT2, ..., CNTm, and controls the arithmetic processing circuits 11a1 to 11am as follows according to the control signals CNT1 to CNTm, respectively. While causing a portion of the arithmetic processing circuits 11a1 to 11am to perform the arithmetic process on an arbitrary neuron group (hereinafter, referred to as a partial neuron group), the control circuit 12 inactivates the arithmetic process by an arbitrary arithmetic processing circuit (hereinafter, referred to as a first arithmetic processing circuit). Then, the control circuit 12 sets information used for the arithmetic process on an arbitrary neuron (hereinafter, referred to as a first neuron) other than the partial neuron group, in the first arithmetic processing circuit. The information used for the arithmetic process includes, for example, information of a neuron whose bit value is changed with respect to the initial values of bit values of all neurons, a weighting factor indicating the magnitude of interaction between the first neuron and each of all neurons, and the initial value of a local field for neurons other than the partial neuron group. The information of the neuron whose bit value is changed includes the bit value and index of the neuron. In addition, when the arithmetic process has been performed for neurons other than the partial neuron group in the past, the information used for the arithmetic process includes information of a neuron whose bit value has been updated with respect to the bit values of all neurons updated last before the arithmetic process has been inactivated last time. In that case, the information used for the arithmetic process also includes the local field for the first neuron calculated last before the arithmetic process has been inactivated. The above information is stored in a storage unit 12a.

After setting the information used for the arithmetic process, the control circuit 12 inactivates the arithmetic process in an arbitrary arithmetic processing circuit (hereinafter, referred to as a second arithmetic processing circuit) among the partial arithmetic processing circuits that are performing the arithmetic process. Then, the control circuit 12 causes the first arithmetic processing circuit that has inactivated, to start (or resume) the arithmetic process for the first neuron as one of the partial arithmetic processing circuits.

In addition, the control circuit 12 stores, in the storage unit 12a, a local field calculated last before the second arithmetic processing circuit inactivates the arithmetic process, and the bit values of all neurons updated last before the second arithmetic processing circuit inactivates the arithmetic process. For example, the control circuit 12 acquires the bit value of the partial neuron group updated last before the second arithmetic processing circuit inactivates the arithmetic process, from an arithmetic processing circuit that is performing the arithmetic process. Then, the control circuit 12 uses the acquired bit value to update the bit value of the partial neuron group among all the neurons stored in the storage unit 12a, and stores the updated bit values of all the neurons in the storage unit 12a, separately from the current bit values of all the neurons.

As described above, the control circuit 12 replaces the neurons processed by the arithmetic processing circuits 11a1 to 11am.

In addition, the control circuit 12 may replace the neurons processed by the arithmetic processing circuits 11a1 to 11am in a predetermined order or based on a random number.

The control circuit 12 may be implemented by an electronic circuit of a specific application such as ASIC or FPGA. The control circuit 12 may also be a processor such as a CPU (Central Processing Unit) or a DSP (Digital Signal Processor). In that case, the processor performs the processing of the control circuit 12 as described above by executing a program stored in the storage unit 12a.

The storage unit 12a stores all weighting factors, all bias factors, bit values of all neurons, and initial values (e.g., bias factors) of local fields. In addition, the storage unit 12a stores the local field calculated last by the second arithmetic processing circuit and the bit values of all neurons updated last before the second arithmetic processing circuit inactivates the arithmetic process.

In addition, in the example of FIG. 1, the storage unit 12a is installed in the control circuit 12, but may be installed outside the control circuit 12. The storage unit 12a is, for example, a volatile storage device such as an SDRAM (Synchronous Dynamic Random Access Memory), a non-volatile storage such as a flash memory, an EEPROM (Electrically Erasable Programmable Read Only Memory) or an HDD (Hard Disk Drive), or a combination thereof.

The update neuron selection circuit 13 selects an update target neuron from one or more update permissible neurons determined to be permitted to be updated in the partial neuron group. Then, the update neuron selection circuit 13 updates the bit value of the update target neuron among the bit values of the neurons held by the respective arithmetic processing circuits that are performing the arithmetic process. In addition, the update neuron selection circuit 13 supplies the update target information to an arithmetic processing circuit that is performing the arithmetic process. The update neuron selection circuit 13 is implemented, for example, using a selection circuit that selects one of the plurality of update permissible neurons as an update target neuron based on a random number.

Hereinafter, an example of an operation of the optimization device 10 according to the first embodiment will be described.

The control circuit 12 causes a portion of the arithmetic processing circuits 11a1 to 11am to perform the arithmetic process for the partial neuron group.

For example, as illustrated in FIG. 1, the control circuit 12 first causes the arithmetic processing circuits excluding the arithmetic processing circuit 11am among the arithmetic processing circuits 11a1 to 11am, to perform the arithmetic process on a partial neuron group including (m−1) number of neurons, and inactivates the arithmetic process by the arithmetic processing circuit 11am.

In that case, the control circuit 12 sets the Ising model information which is used for the arithmetic process on any one of the (m−1) neurons stored in the storage unit 12a, in each of the arithmetic processing circuits excluding the arithmetic processing circuit 11am among the arithmetic processing circuits 11a1 to 11am.

For example, in the following, it is assumed that the indexes of (m−1) neurons are 1 to m−1. At this time, when the arithmetic processing circuit 11a1 performs the arithmetic process on a neuron with index=1, the control circuit 12 sets $W_{11}$ to $W_{1(m-1)}$ in the arithmetic processing circuit 11a1. In addition, the control circuit 12 may set weighting factors $W_{11}$ to $W_{1n}$ indicating the magnitude of interaction between each of all neurons and the neuron with index=1 in the arithmetic processing circuit 11a1 that performs the arithmetic process for the neuron with index=1. In addition, n is the total number of neurons.

In addition, the control circuit 12 sets the initial values of the bit values of the (m−1) neurons stored in the storage unit 12a and the initial value of the local field, in the arithmetic processing circuits 11a1 to 11a(m−1), respectively. When the initial values of the bit values of all neurons are 0, the initial value of the local field is a bias factor according to the equation (2). Then, each of the arithmetic processing circuits 11a1 to 11a(m−1) determines whether to permit updating for each of the (m−1) neurons, based on the initial value of the local field, the thermal noise, and the initial values of the bit values of the (m−1) neurons.

The update neuron selection circuit 13 selects an update target neuron from one or more update permissible neurons determined to be permitted to be updated in the (m−1) neurons. Then, the update neuron selection circuit 13 updates the bit value of the update target neuron among the bit values of the neurons held by the arithmetic processing circuits 11a1 to 11a(m−1). Further, the update neuron selection circuit 13 supplies the bit value and index of the update target neuron to the arithmetic processing circuits 11a1 to 11a(m−1). In the example of FIG. 1, the index j and the update target neuron bit value $x_j$ are supplied to the arithmetic processing circuits 11a1, 11a2, etc.

The arithmetic processing circuits 11a1 to 11a(m−1) calculate (update) the local fields based on the supplied update target information and Ising model information. For example, when the arithmetic processing circuit 11a1 updates the local field $h_1$ for a bit with index=1, the arithmetic processing circuit 11a1 adds $W_{1j}$ to the original $h_1$ when the updated $x_j$ is 1, and subtracts $W_{1j}$ from the original $h_1$ when the updated $x_j$ is 0.

In addition, the arithmetic processing circuits 11a1 to 11a(m−1) perform the above determination process again based on the updated local fields. Further, the update neuron selection circuit 13 again performs the selection of the update target neuron, the update of the update target neuron, and the supply of information of the update target neuron to the arithmetic processing circuits 11a1 to 11a(m−1).

The control circuit 12 reduces the temperature parameter every time the above arithmetic process is iterated a predetermined number of times. Then, for example, in any of the arithmetic processing circuits that are performing the arithmetic process, the control circuit 12 performs the following process when the change amount of the local field remains at 0 for a predetermined period or when the arithmetic process is repeated a predetermined number of times (which is greater than the number of times of changing the temperature parameter).

The control circuit 12 sets the information used for the arithmetic process on the first neuron in the arithmetic processing circuit 11am while causing the arithmetic processing circuits 11a1 to 11a(m−1) to perform the arithmetic process.

In the example of FIG. 1, $W_{81}$ to $W_{8n}$ used for the arithmetic process for a neuron with index=8 which is not included in index=1 to m−1 are set in the arithmetic processing circuit 11am. In addition, the control circuit 12 sets an initial value of $h_8$ (a bias factor $b_8$ when the initial values of the bit values of all neurons are 0) in the arithmetic processing circuit 11am. In addition, for example, the control circuit 12 supplies information of neurons different from the initial values among all the neurons to the arithmetic processing circuit 11am in order, such that the arithmetic processing circuit 11am may update the initial value of $h_8$ according to the current bit values of all the neurons. In addition, when the update neuron selection circuit 13 outputs the update target information during the update of $h_8$, for example, the arithmetic processing circuit 11am interrupts the updating process of $h_8$ using the information supplied from the control circuit 12. Then, the arithmetic processing circuit 11am updates $h_8$ using the update target information supplied from the update neuron selection circuit 13, and then, restarts the updating of $h_8$ using the information supplied from the control circuit 12. In addition, the arithmetic processing circuit 11am may update $h_8$ using both the update target information supplied from the update neuron selection circuit 13 and the information supplied from the control circuit 12 at the same timing. For example, when the update neuron selection circuit 13 outputs index=1 and $x_1$=1 and the control circuit 12 outputs index=2 and $x_2$=1, the arithmetic processing circuit 11am may update $h_8$ at the same timing by adding $W_{81}+W_{82}$ to $h_8$.

In addition, when a weighting factor for the neuron with index=8 is not set in an arithmetic processing circuit that continues the arithmetic process among the arithmetic processing circuits 11a1 to 11am, the weighting factor is set based on the control of the control circuit 12.

Then, the control circuit 12 causes one of the arithmetic processing circuits that are performing the arithmetic process, for example, the arithmetic processing circuit 11a2, to inactivate the arithmetic process. In addition, the control circuit 12 stores in the storage unit 12a the local field $h_2$ calculated last before the arithmetic processing circuit 11a2 inactivates the arithmetic process and the bit values of all the neurons updated last before the arithmetic processing circuit 11a2 inactivates the arithmetic process.

Thereafter, the control circuit 12 causes the arithmetic processing circuit 11am that has inactivated, to start the arithmetic process for the neuron with index=8.

Thereafter, the same processing is repeated. FIG. 1 illustrates an example in which information ($W_{71}$ to $W_{7n}$, etc.) used for the arithmetic process for the neuron with index=7 is set in the arithmetic processing circuit 11a2 that has inactivated the arithmetic process.

In addition, $h_2$ stored in the storage unit 12a and the bit values of all neurons are set in an arithmetic processing circuit that performs the arithmetic process, when the arithmetic process for the neuron with index=2 is performed again. Then, $h_2$ is updated according to the same process as that for updating $h_8$ as described above.

In addition, the control circuit 12 replaces the neurons processed by the arithmetic processing circuits 11a1 to 11am, for example, in a predetermined order.

FIG. 2 is a view illustrating an example of replacement of neurons to be processed.

For the purpose of simplification of description, it is assumed that the total number of neurons is 10 and the number of arithmetic processing circuits 11a1 to 11am is 5 (m=5). In addition, in FIG. 2, neurons with index=1 to 10 are expressed as neurons 1 to 10, respectively.

For example, the control circuit 12 first causes the arithmetic processing circuits 11a1 to 11a4 to perform the arithmetic process for the neurons 1 to 4, and sets information used for the arithmetic process for the neuron 10 in the inactive arithmetic processing circuit 11a5. Next, the control circuit 12 causes the arithmetic processing circuits 11a1 to 11a3 and 11a5 to perform the arithmetic process for the neurons 1 to 3 and 10, and sets information used for the arithmetic process for the neuron 9 in the arithmetic processing circuit 11a4 being inactive. Thereafter, the control circuit 12 causes the arithmetic processing circuits 11a1, 11a2, 11a4, and 11a5 to perform the arithmetic process for the neurons 1, 2, 9, and 10, and sets information used for the arithmetic process for the neuron 8 in the arithmetic processing circuit 11a3 being inactive.

The control circuit 12 iterates the above-described replacement process, for example, until the arithmetic process for all neurons is performed, or until the change of the local field does not change from 0 for a predetermined period in any of the arithmetic processing circuits that are performing the arithmetic process. Then, the control circuit 12 outputs the bit value of each neuron when the above replacement process is ended, as a solution to the optimization problem.

As described above, the optimization device 10 according to the first embodiment causes a portion of the arithmetic processing circuits fewer than the total number of neurons, to perform the arithmetic process on a portion of the neurons, and during the course, sets information used for the arithmetic process for one of the other neurons in an arithmetic processing circuit that has inactivated the arithmetic process. Then, the optimization device 10 may perform the arithmetic process for other neurons by replacing the arithmetic processing circuit that inactivates the arithmetic process, thereby facilitating large-scale arithmetic operations with a small amount of hardware.

In addition, since the setting of information used for the arithmetic process for other neurons in the arithmetic processing circuit that has inactivated the arithmetic process is performed while other arithmetic processing circuits are performing the arithmetic process, interruption of the arithmetic process by the replacement of neurons to be processed does not occur, thereby suppressing an increase in calculation time.

Further, since the large-scale arithmetic operations may be performed even with a single chip, a problem such as complication of inter-chip connection that occurs when multiple chips are used does not occur.

In the above description, the number of arithmetic processing circuits that inactivate the arithmetic process is one, but may be two or more. In that case, a plurality of neurons to be processed and a plurality of neurons to be inactivated may be replaced at the same time.

Second Embodiment

Figure 3:
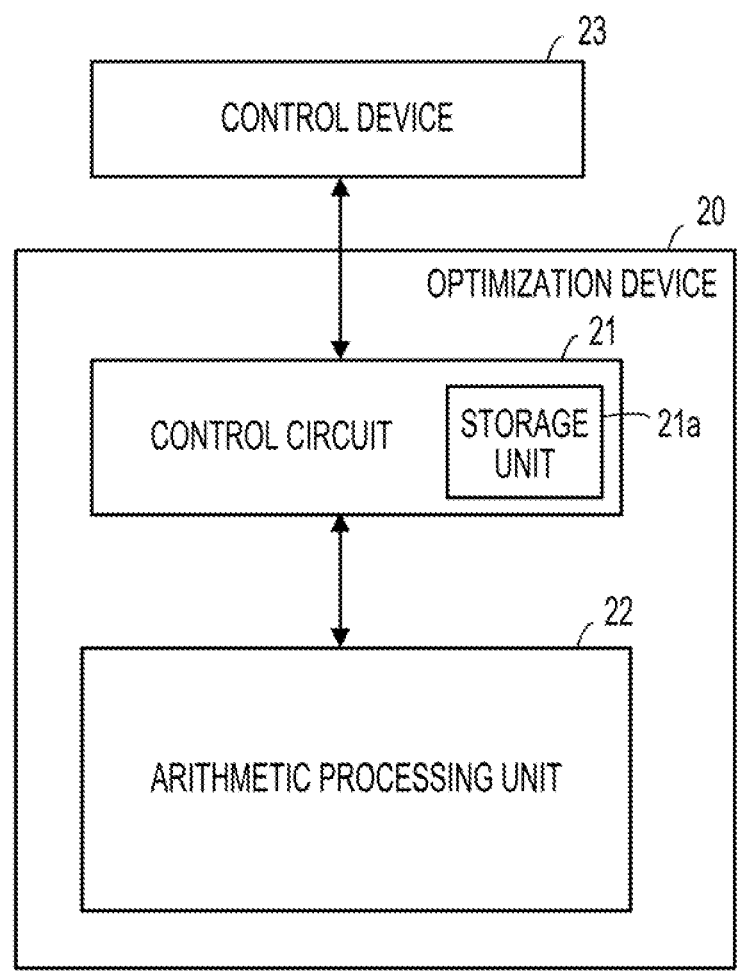
FIG. 3 is a view illustrating an example of an optimization device according to a second embodiment.

FIG. 3 is a view illustrating an example of an optimization device according to a second embodiment.

An optimization device 20 includes a control circuit 21 and an arithmetic processing unit 22.

The control circuit 21 outputs various control signals to the arithmetic processing unit 22 and controls the arithmetic process in the arithmetic processing unit 22. In addition, the control circuit 21 has a storage unit 21a, supplies various types of information stored in the storage unit 21a to the arithmetic processing unit 22, and stores information (calculation results and information during calculation) obtained by the arithmetic processing unit 22 in the storage unit 21a.

Further, the control circuit 21 exchanges information with a control device 23 (e.g., a PC (Personal Computer)). Examples of the information sent from the control device 23 to the control circuit 21 may include all weighting factors, all bias factors, initial values of bit values of all neurons, initial values of local fields, a temperature change schedule on how to change a temperature parameter, etc. Example of the information transmitted from the control circuit 21 to the control device 23 may include the calculation results of the optimization problem obtained by the arithmetic processing unit 22, etc.

The control circuit 21 may be implemented by an electronic circuit for a specific application such as ASIC or FPGA. In addition, the control circuit 21 may be a processor such as a CPU or a DSP. In that case, for example, a processor performs various processes by executing a program stored in the storage unit 21a.

The storage unit 21a stores all weighting factors, all bias factors, bit values of all neurons, and initial values of local fields. The storage unit 21a further stores information (calculation results and information during calculation) obtained by the arithmetic processing unit 22.

In the example of FIG. 3, the storage unit 21a is installed in the control circuit 21, but may be installed outside the control circuit 21. The storage unit 21a may be, for example, a volatile storage device such as SDRAM, a nonvolatile storage such as flash memory, EEPROM or HDD, or a combination thereof.

The arithmetic processing unit 22 searches for the ground state of the Ising model under the control of the control circuit 21.

Figure 4:
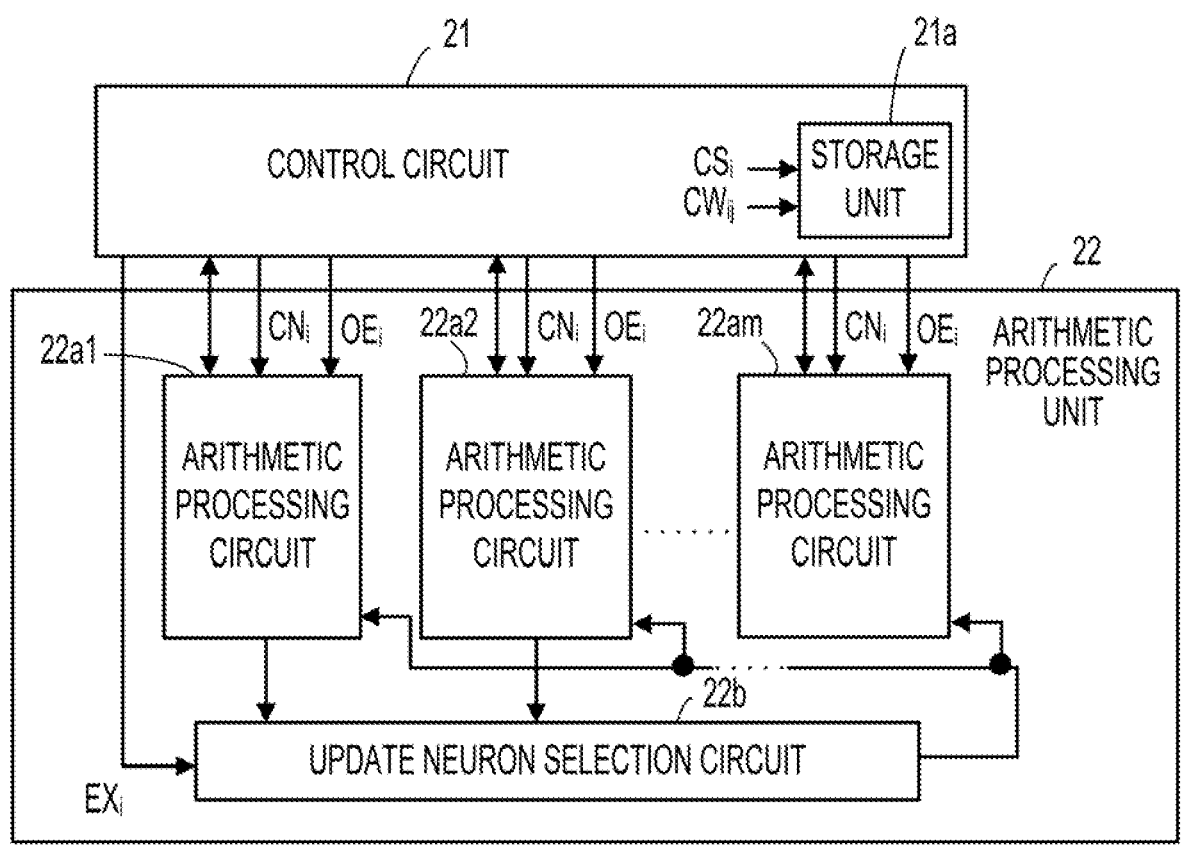
FIG. 4 is a view illustrating an example of an arithmetic processing unit.

FIG. 4 is a view illustrating an example of the arithmetic processing unit.

The arithmetic processing unit 22 includes arithmetic processing circuits $22a1, 22a2, \ldots, 22am$ and an update neuron selection circuit $22b$.

Each of the arithmetic processing circuits $22a1$ to $22am$ holds a bit value of each of a plurality of neurons. Further, each of the arithmetic processing circuits $22a1$ to $22am$ calculates a local field based on a weighting factor and a bit value and index of an update target neuron supplied from the update neuron selection circuit $22b$. In addition, each of the arithmetic processing circuits $22a1$ to $22am$ determines whether to permit updating of a bit value of a neuron, based on a temperature parameter, a thermal noise determined based on a random number, a local field, and the bit value of the neuron. The temperature parameter is supplied from the control circuit 21. Each of the arithmetic processing circuits $22a1$ to $22am$ iterates the arithmetic process including the above process. Hereinafter, the iteration of the above arithmetic process may be referred to as an iteration operations.

In addition, the number of arithmetic processing circuits $22a1$ to $22am$ is smaller than the total number of neurons. For this reason, the control circuit 21 replaces neurons for which the arithmetic process is to be performed.

The arithmetic processing circuits $22a1$ to $22am$ are included in, for example, a single-chip or multiple-chip semiconductor integrated circuit (ASIC, FPGA or the like).

Further, FIG. 4 illustrates various control signals. The control signals are generated by a control signal generation circuit (not illustrated) in the control circuit 21. Control signals $CS_i$ and $CW_{ij}$ are supplied to the storage unit $21a$.

The control signal $CS_i$ is a control signal for reading information excluding a weighting factor in information used for the arithmetic process for a neuron with index=i (i is any one of 1 to n) from the storage unit $21a$ and setting the read information in any one of the arithmetic processing circuits $22a1$ to $22am$. An example of the read information will be described later.

The control signal $CW_{ij}$ (i, j is any one of 1 to n) is a control signal for reading any one of all weighting factors from the storage unit $21a$ and setting the read weighting factor in the arithmetic processing unit 22.

Further, control signals $CN_i$ and $OE_i$ are supplied to the arithmetic processing circuits $22a1$ to $22am$.

The control signal $CN_i$ is a control signal for controlling the execution and the inactivation of the arithmetic process for a neuron with index=i. When the control signal $CN_i$ is active, the arithmetic process for the neuron with index=i is performed. When the control signal $CN_i$ is inactive (e.g., when the value thereof is 0), the arithmetic process for the neuron with index=i is inactivated.

The control signal $OE_i$ is a control signal for reading the bit value of each neuron from an arithmetic processing circuit that is performing the arithmetic process, and reading a local field for the neuron with index=i, when the arithmetic process for the neuron with index=i is inactivated.

Further, a control signal $EX_i$ is supplied to the update neuron selection circuit $22b$.

The control signal $EX_j$ is a control signal for controlling whether to validate a selection of the neuron with index=i as the update target neuron. When the control signal $EX_j$ is active, the selection of the neuron with index=i as the update target neuron is validated.

Figure 5:
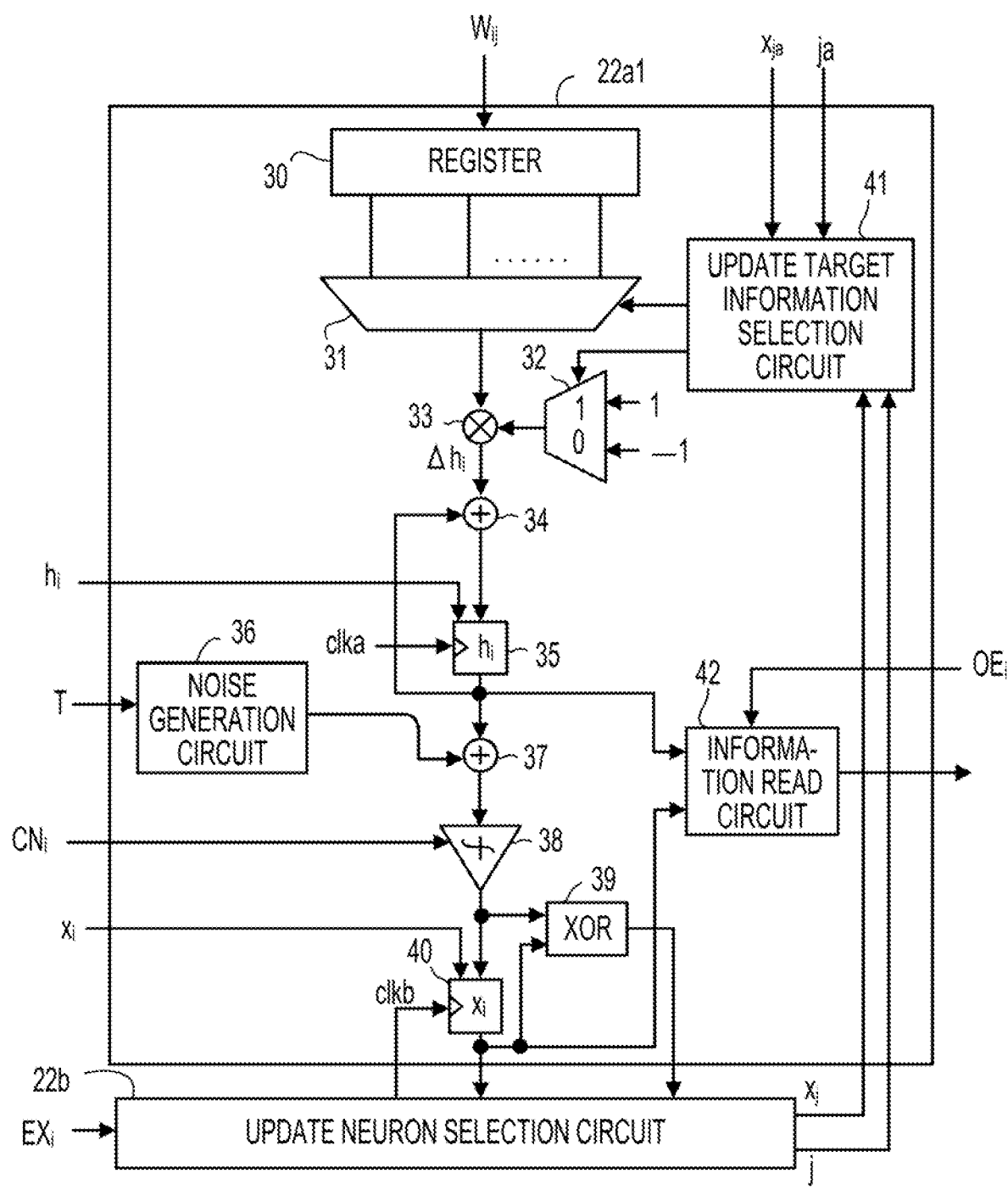
FIG. 5 is a view illustrating an example of an arithmetic processing circuit.

FIG. 5 is a view illustrating an example of an arithmetic processing circuit. While FIG. 5 illustrates an example of the arithmetic processing circuit 22a1, the other arithmetic processing circuits 22a2 to 22am may also be implemented with the same circuits as those in FIG. 5.

The arithmetic processing circuit 22a1 includes a register 30, selection circuits 31 and 32, a multiplication circuit 33, an addition circuit 34, a register 35, a noise generation circuit 36, an addition circuit 37, a comparison circuit 38, an XOR circuit 39 which is an exclusive logical sum circuit, and a register 40. The arithmetic processing circuit 22a1 further includes an update target information selection circuit 41 and an information read circuit 42.

In the register 30, $W_{ij}$ read from the storage unit 21a are set (stored).

The selection circuit 31 selects and outputs one of $W_{ij}$ stored in the register 30 based on an index output from the update target information selection circuit 41 to be described later.

Assuming that a value before update of the bit value of an update target neuron is $x_{jp}$, the amount of change in $h_i$ ($\Delta h_i$) when $x_{jp}$ changes to $x_j$ may be expressed as $W_{ij}(1-2x_{jp})$.

The selection circuit 32 implements the above-described $(1-2x_{jp})$ calculation, and selects and outputs 1 or −1 based on the bit value of a neuron output from the update target information selection circuit 41 to be described later. When the bit value of the neuron is 0, the selection circuit 32 selects and outputs −1. When the bit value of the neuron is 1, the selection circuit 32 selects and outputs 1.

The multiplication circuit 33 outputs $\Delta h_i$ which is the product of the weighting factor output from the selection circuit 31 and the value output from the selection circuit 32.

The addition circuit 34 updates $h_i$ by adding $\Delta h_i$ to $h_i$ stored in the register 35.

The register 35 receives $h_i$ output from the addition circuit 34 in synchronization with a clock signal clka (e.g., supplied from the control circuit 21). The register 35 is, for example, a flip-flop. At the time of initializing the arithmetic process for the neuron with index=i, the initial value of $h_i$ is read from the storage unit 21a by the control circuit 21 and is set in the register 35. In addition, at the time of resuming the arithmetic process for the neuron with index=i from an inactivated state, the last calculated $h_i$ is read from the storage unit 21a by the control circuit 21 and is set in the register 35.

The noise generation circuit 36 generates a thermal noise based on a temperature parameter T and a random number in order to perform a simulated annealing. As for the noise generation circuit 36, for example, an LFSR or the like may be used. At the time of the simulated annealing, T is controlled by the control circuit 21 so as to be gradually decreased. Accordingly, the noise width of the thermal noise generated by the noise generation circuit 36 gradually decreases.

The addition circuit 37 adds the thermal noise output from the noise generation circuit 36 to the local field $h_i$ output from the register 35, and outputs the result of the addition.

The comparison circuit 38 outputs 0 when the value output from the addition circuit 37 is equal to or greater than a threshold (e.g., 0), and outputs 1 when the value is smaller than the threshold. In addition, when the control signal $CN_i$ is supplied from the control circuit 21 to the comparison circuit 38 and the control signal $CN_i$ is inactive, the comparison circuit 38 does not perform the comparison operation to inactivate the arithmetic process for the neuron with index=i.

The XOR circuit 39 outputs a value indicating whether to permit updating of the bit value of the neuron with index=i, based on the value output from the comparison circuit 38 and the value $x_i$ stored in the register 40. For example, the XOR circuit 39 outputs 0 indicating that the updating is not permitted when the value output from the comparison circuit 38 matches the value $x_i$ stored in the register 40, and outputs 1 that the updating is permitted when both values do not match. The output value of the XOR circuit 39 is supplied to the update neuron selection circuit 22b.

When the clock signal clkb is supplied from the update neuron selection circuit 22b to the register 40, the register 40 receives the value output from the comparison circuit 38, as $x_i$. At the time of initializing the arithmetic process for the neuron of index=i, the initial value of $x_i$ is read from the storage unit 21a by the control circuit 21 and is set in the register 40. At the time of resuming the arithmetic process for the neuron of index=i from an inactivated state, the last calculated $x_i$ is read from the storage unit 21a by the control circuit 21 and is set in the register 40. The value $x_i$ output from the register 40 is supplied to the update neuron selection circuit 22b.

The update target information selection circuit 41 is supplied with the value $x_j$ of the update target bit output from the update neuron selection circuit 22b and the index=j of the update target bit. In addition, the update target information selection circuit 41 is supplied with $x_{ja}$ and index=ja from the control circuit 21 when the arithmetic processing circuit 22a1 returns from the inactivated state.

When the arithmetic processing circuit 22a1 returns from the inactivated state so that the arithmetic process for a neuron of index=i that has not been selected so far is performed, the initial value of $h_i$ is updated according to the current bit values of all neurons. In addition, when the arithmetic processing circuit 22a1 returns from the inactivated state so that the arithmetic process for the neuron with index=i is performed again, $h_i$ calculated last in the previous process is updated according to the current bit values of all neurons. Therefore, for the initial values of the bit values of all neurons or for the bit values of all neurons updated last before the previous arithmetic process for the neuron with index=i is inactivated, the control circuit 21 reads the updated neuron information from the storage unit 21a and supplies the updated neuron information to the update target information selection circuit 41. In FIG. 5, the updated neuron information is illustrated as a value $x_{ja}$ and an index=ja. Then, the update target information selection circuit 41 supplies the index=ja to the selection circuit 31 and supplies $x_{ja}$ to the selection circuit 32. As a result, $h_i$ is updated. This process is performed for all updated neurons. However, when the update neuron selection circuit 22b outputs $x_j$ or index=j during the updating of $h_i$, for example, the update target information selection circuit 41 suspends the selection of $x_{ja}$ and index=ja, and selects and outputs $x_j$ and index=j.

In addition, when $x_{ja}$ and index=ja are not supplied from the control circuit 21, the update target information selection circuit 41 selects and outputs $x_j$ and index=j supplied from the update neuron selection circuit 22b.

When the control signal $OE_i$ is active, the information read circuit 42 reads $x_i$ held in the register 40 and transmits the read $x_i$ to the control circuit 21. When the index=i is an index=M of a neuron that inactivates a process to be described later, the information reading circuit 42 reads $h_i$ (=$h_M$) held in the register 35 together with $x_i$ and transmits the read $h_i$ and $x_i$ to the control circuit 21. In addition, the arithmetic processing circuit 22a1 may have, for example, a register that holds an index for identifying a neuron for which the arithmetic process is being performed. This index is set by the control circuit 21.

The update neuron selection circuit 22b selects an update target neuron from one or more update permissible neurons output from an arithmetic processing circuit that is performing the arithmetic process among the arithmetic processing circuits 22a1 to 22am. Then, the update neuron selection circuit 22b updates the bit value of the update target neuron among the bit values of the neurons held by the respective arithmetic processing circuits that are performing the arithmetic process. For example, the update neuron selection circuit 22b supplies the above-described clock signal clkb to the arithmetic processing circuit that is performing the arithmetic process on the update target neuron. The update neuron selection circuit 22b does not select a neuron for which the control signal $EX_i$ is inactive, as an update target neuron. The update neuron selection circuit 22b supplies the bit value and index of the update target neuron to the arithmetic processing circuit that is performing the arithmetic process. For example, when there are a plurality of update permissible neurons, the update neuron selection circuit 22b is implemented using a selection circuit or the like that selects one of the plurality of update permissible neurons as an update target neuron based on a random number.

Hereinafter, an example of an operation of the optimization device 20 according to the second embodiment will be described.

Figure 6:
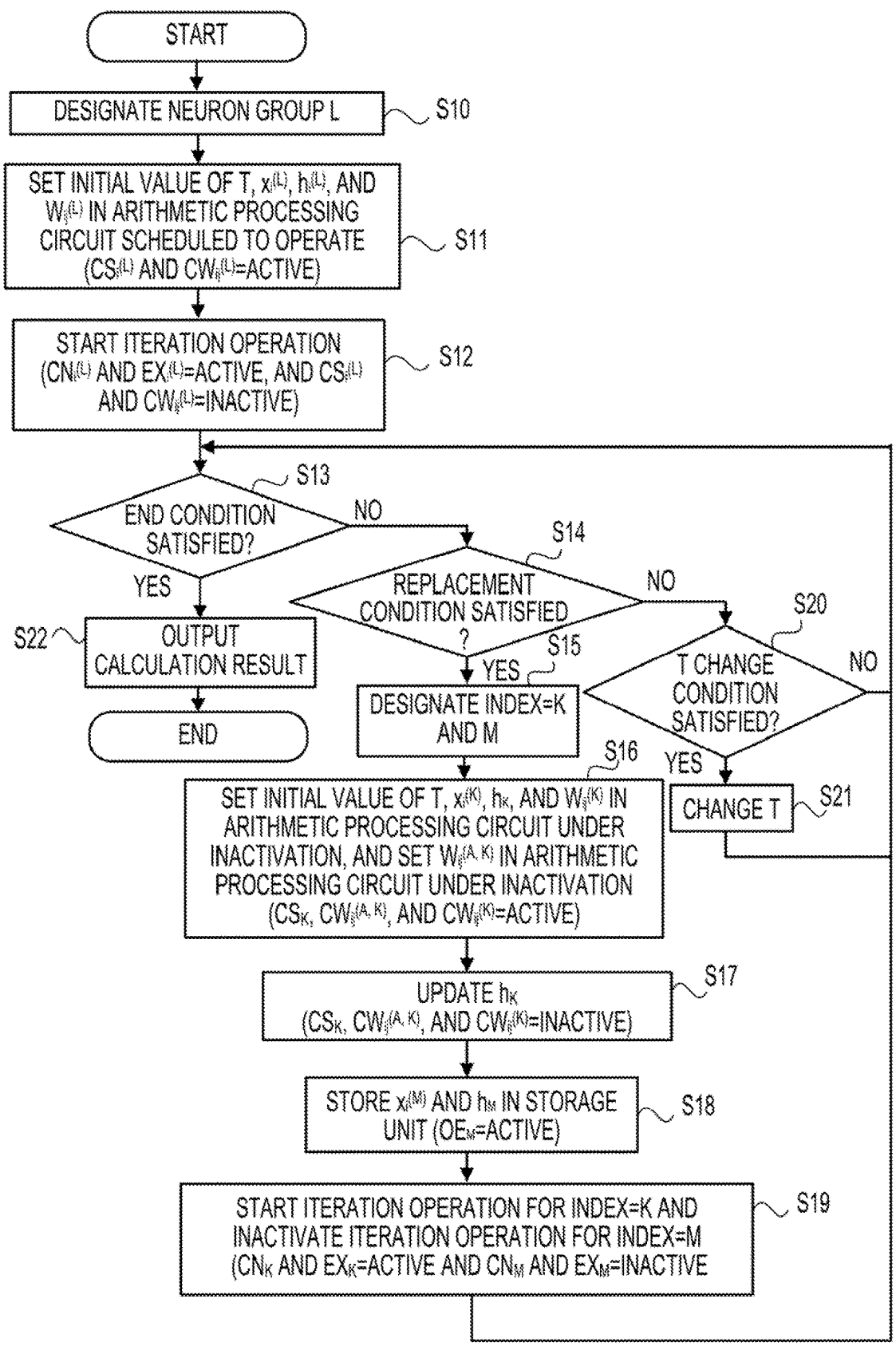
FIG. 6 is a flowchart illustrating a flow of an example of the optimization device according to the second embodiment.

FIG. 6 is a flowchart illustrating a flow of an example of the optimization device according to the second embodiment.

First, the control circuit 21 designates a neuron group L to be processed for the first time in the arithmetic processing unit 22 (step S10). The number of neurons in the neuron group L is equal to or smaller than m−1 (m is the number of arithmetic processing circuits 22a1 to 22am). In addition, the control device 23 may designate the neuron group L to be processed for the first time for the optimization device 20.

After designating the neuron group L, the control circuit 21 makes control signals $CS_j^{(L)}$ and $CW_{ij}^{(L)}$ active (step S11). The control signal $CS_j^{(L)}$ is a control signal $CS_j$ used for the arithmetic process for the neurons included in the neuron group L. The control signal $CW_{ij}^{(L)}$ is a control signal $CW_{ij}$ used for the arithmetic process on the neurons included in the neuron group L. When the control signals $CS_j^{(L)}$ and $CW_{ij}^{(L)}$ become active, $x_i^{(L)}$, $h_i^{(L)}$, and $W_{ij}^{(L)}$ are set in arithmetic processing circuits that are scheduled to operate and correspond to the number of neurons included in the neuron group L, among the arithmetic processing circuits 22a1 to 22am. The values $x_i^{(L)}$ and $h_i^{(L)}$ are the initial value of a bit value of a neuron included in the neuron group L and the initial value of a local field for a neuron included in the neuron group L, respectively. The symbol $W_{ij}^{(L)}$ is a weighting factor indicating the magnitude of interaction between the neurons included in the neuron group L. In addition, in the process of step S11, the initial value of a temperature parameter is also set in the arithmetic processing circuits scheduled to operate.

Thereafter, the control circuit 21 makes control signals $CN_i^{(L)}$ and $EX_i^{(L)}$ active, and makes the control signals $CS_i^{(L)}$ and $CW_{ij}^{(L)}$ inactive (step S12). The control signal $CN_i^{(L)}$ is a control signal $CN_i$ for controlling the execution and the inactivation of the arithmetic process for the neurons included in the neuron group L. The control signal $EX_i^{(L)}$ is a control signal $EX_i$ for controlling whether to validate a selection of a neuron included in the neuron group L as an update target neuron. When the control signals $CN_i^{(L)}$ and $EX_i^{(L)}$ become active, an iteration operation for each of the neurons included in the neuron group L is performed in an arithmetic processing circuit. Among the arithmetic processing circuits 22a1 to 22am, arithmetic processing circuits other than the number of neurons included in the neuron group L inactivate the iteration operation.

Thereafter, the control circuit 21 determines whether or not the end condition is satisfied (step S13). For example, in the iteration operation for the neuron group including the last replaced neuron, the control circuit 21 performs the arithmetic process for all neurons and determines that the end condition is satisfied when $\Delta h_i$ is 0 for any neuron for a predetermined period. Alternatively, the control circuit 21 may continue the replacement process until $\Delta h_i$ becomes 0 for any neuron for a predetermined period after the arithmetic process for all neurons is performed. The value of $\Delta h_i$ may be detected from the output of the multiplication circuit 33, for example, as illustrated in FIG. 5.

When it is determined that the end condition is satisfied, the process of step S22 is performed.

When it is determined that the end condition is not satisfied, the control circuit 21 determines whether or not the replacement condition for replacing a neuron to be processed is satisfied (step S14). For example, when $\Delta h_i$ remains 0 for any neuron processed for a predetermined period, the control circuit 21 determines that the replacement condition is satisfied. Alternatively, when the number of iteration operations reaches a predetermined number, the control circuit 21 may determine that the replacement condition is satisfied.

When it is determined that the replacement condition is not satisfied, the process of step S20 is performed.

When it is determined that the replacement condition is satisfied, the control circuit 21 designates indexes=K and M (step S15). Index=K is an index of a replacing neuron (a neuron whose processing is inactivated), and index=M is an index of a replaced neuron (a neuron processed). The selection order of indexes=K and M may be designated in advance by the control device 23. Further, the control circuit 21 may designate indexes=K and M based on a random number.

After designating the indexes=K and M, the control circuit 21 makes control signals $CS_K$, $CW_{ij}^{(A, K)}$, and $CW_{ij}^{(K)}$ active (step S16). The control signal $CS_K$ is a control signal $CS_i$ used for the arithmetic process for a neuron with index=K. The control signal $CW_{ij}^{(A, K)}$ is a control signal $CW_{ij}$ for reading a weighting factor $W_{ij}^{(A, K)}$ indicating the magnitude of interaction between a neuron with index=K and a neuron with index=A for which processing continues, and setting the read weighting factor in the arithmetic processing unit 22. The control signal $CW_{ij}^{(K)}$ is a control signal $CW_{ij}$ for reading a weighting factor $W_{ij}^{(K)}$ indicating the magnitude of interaction between a neuron with index=K and all other neurons, and setting the read weighting factor in the arithmetic processing unit 22. When the control signals $CS_K$ and $CW_{ij}^{(K)}$ are made active, $x_i^{(K)}$, $h_K$, and $W_{ij}^{(K)}$ are set in any one arithmetic processing circuit that has inactivated the iteration operation, among the arithmetic processing circuits 22a1 to 22am. Further, when the control signal $CW_{ij}^{(A, K)}$ is made active, $W_{ij}^{(A, K)}$ is set in an arithmetic processing circuit that continues the iteration operation, among the arithmetic processing circuits 22a1 to 22am.

The value $x_i^{(K)}$ includes a bit value of a neuron updated at the time point of the process of step S14, and $x_K$ for the initial values of the bit values of all neurons or for the bit values of all neurons updated last when the previous neuron of index=K is processed. In the process of step S16, the control circuit 21 updates the bit values of all neurons stored in the storage unit 21a by using the value held in a register (ea., the register 40 of FIG. 5) of an arithmetic processing circuit in operation among the arithmetic processing circuits 22a1 to 22m. Then, the control circuit 21 determines $x_i^{(K)}$ based on a difference between the updated bit values of all neurons and the initial values of the bit values of all neuron or all the neurons last updated when the previous neuron of index=K is processed. The $x_{ja}$ illustrated in FIG. 5 is included in $x_i^{(K)}$. The $x_K$ is set in, for example, the register 40 illustrated in FIG. 5. The index=ja in FIG. 5 is also set in the arithmetic processing circuit that has inactivated the iteration operation.

Then, the arithmetic processing circuit that has inactivated the iteration operation selects $x_{ja}$ and ja set by the control circuit 21 in the update target information selection circuit 41 of FIG. 5, and updates $h_i$ (here, i=K) (step S17). The control circuit 21 makes the control signals $CS_K$, $CW_{ij}^{(A,K)}$ and $CW_{ij}^{(K)}$ inactive after setting $x_i^{(K)}$, $h_K$, $W_{ij}^{(K)}$, and $W_{ij}^{(A,K)}$.

Thereafter, the control circuit 21 makes a control signal $OE_M$ active (step S18). The control signal $OE_M$ is a control signal for reading a local field for a neuron with index=M designated in the process of step S15 and a bit value of each neuron from an arithmetic processing circuit that is performing the arithmetic process. When the control signal $OE_M$ is made active, $h_M$ and the bit value of each neuron from the arithmetic processing circuit that is performing the arithmetic process are read. The control circuit 21 updates the bit values of all neurons stored in the storage unit 21a using the read bit value of each neuron, and stores the updated bit values ($x_i^{(M)}$) of all the neurons in the storage unit 21a together with the read $h^M$.

The control signal $OE_M$ becomes inactive when the storage of $x_i^{(M)}$ and $h_M$ in the storage unit 21a is completed.

Thereafter, the control circuit 21 makes control signals $CN_K$ and $EX_K$ active, and makes control signals $CN_M$ and $EX_M$ inactive (step S19). The control signal $CN_K$ is a control signal $CN_i$ for controlling the execution and the inactivation of the arithmetic process on a neuron with index=K. The control signal $EX_K$ is a control signal $EX_i$ for controlling whether to validate a selection of the neuron with index=K as an update target neuron. When the control signals $CN_K$ and $EX_K$ are made active, the iteration operation on the neuron with index=K is started in an arithmetic processing circuit that has inactivated the arithmetic process. The control signal $CN_M$ is a control signal $CN_i$ for controlling the execution and the inactivation of the arithmetic process for a neuron with index=M. The control signal $EX_M$ is a control signal $EX_i$ for controlling whether to validate a selection of the neuron with index=M as an update target neuron. When the control signals $CN_M$ and $EX_M$ are made inactive, an arithmetic processing circuit that is performing the arithmetic process on the neuron with index=M is inactivated, and the iteration operation for the neuron with index=M is inactivated.

Thereafter, the process returns to step S13.

When it is determined in the process of step S14 that the replacement condition is not satisfied, the control circuit 21 determines whether or not a temperature parameter change condition is satisfied (step S20). For example, when the number of times of iteration operation reaches a predetermined number, the control circuit 21 determines that the temperature parameter change condition is satisfied.

When the control circuit 21 determines that the temperature parameter change condition is not satisfied, the process from step S13 is iterated. When it is determined that the temperature parameter change condition is satisfied, the control circuit 21 changes the temperature parameter (step S21). For example, the control circuit 21 decreases the value of the temperature parameter according to a temperature change schedule supplied from the control device 23. After the process of step S21, the process from step S13 is iterated.

When it is determined in the process of step S13 that the end condition is satisfied, the control circuit 21 outputs the current bit values of all the neurons stored in the storage unit 21a as a solution (calculation result) to the optimization problem (step S22) and ends the process. The calculation result output by the control circuit 21 is displayed, for example, on a display device or the like in the control device 23.

Hereinafter, an example of a process for replacing a neuron to be processed will be described.

FIG. 7 is a view illustrating an example of the relationship between the operation state of each neuron during the replacement process and a control signal made active.

In FIG. 7, a neuron with index=A for which the iteration operation is continued is denoted as a "neuron A," the above-described neuron with index=M is denoted as a "neuron M," and the above-described neuron with index=K is denoted as a "neuron K."

In the operation state "a," control signals $CN_A$, $CN_M$, $EX_A$, and $EX_M$ are made active, the iteration operation is performed for the neurons A and M, and the iteration operation is inactivated for the neuron K.

The operation state "b" is an operation state at the time of the process of step S16 in FIG. 6. The iteration operation for the neurons A and M continues. Furthermore, in addition to the control signals made active in the operation state "a," control signals $CW_{ij}^{(K)}$, $CW_{ij}^{(A,K)}$, and $CS_K$ are made active. At this time, $W_{ij}^{(A,K)}$ is set in an arithmetic processing circuit that is performing the iteration operation for the neuron A, and $x_i^{(K)}$, $h_K$, and $W_{ij}^{(K)}$ are set in any one arithmetic processing circuit that has inactivated the iteration operation.

The operation state "c" is an operation state at the time of the process of step S17 in FIG. 6. The iteration operation for the neurons A and M continues. Further, in the operation state "c," the local field $h_K$ is updated for the neuron K.

The operation state "d" is an operation state at the time of the process of step S18 in FIG. 6. The iteration operation for the neurons A and M continues. Further, the updating of $h_K$ continues. However, in the operation state "d," the control signal $OE_M$ is made active. When the control signal $OE_M$ is made active, $h_M$ and $x_i^{(M)}$ are stored in the storage unit 21a. The control signal OEM becomes inactive when the storage of $h_M$ and $x_i^{(M)}$ in the storage unit 21a is completed.

The operation state "e" is an operation state at the time of the process of step S19 in FIG. 6. The iteration operation for the neuron A continues. Meanwhile, when the control signals $CN_M$ and $EX_M$ become inactive and the control signals $CN_K$ and $EX_K$ become active, the iteration operation for the neuron M is inactivated and the iteration operation for the neuron K is started.

Figure 8:
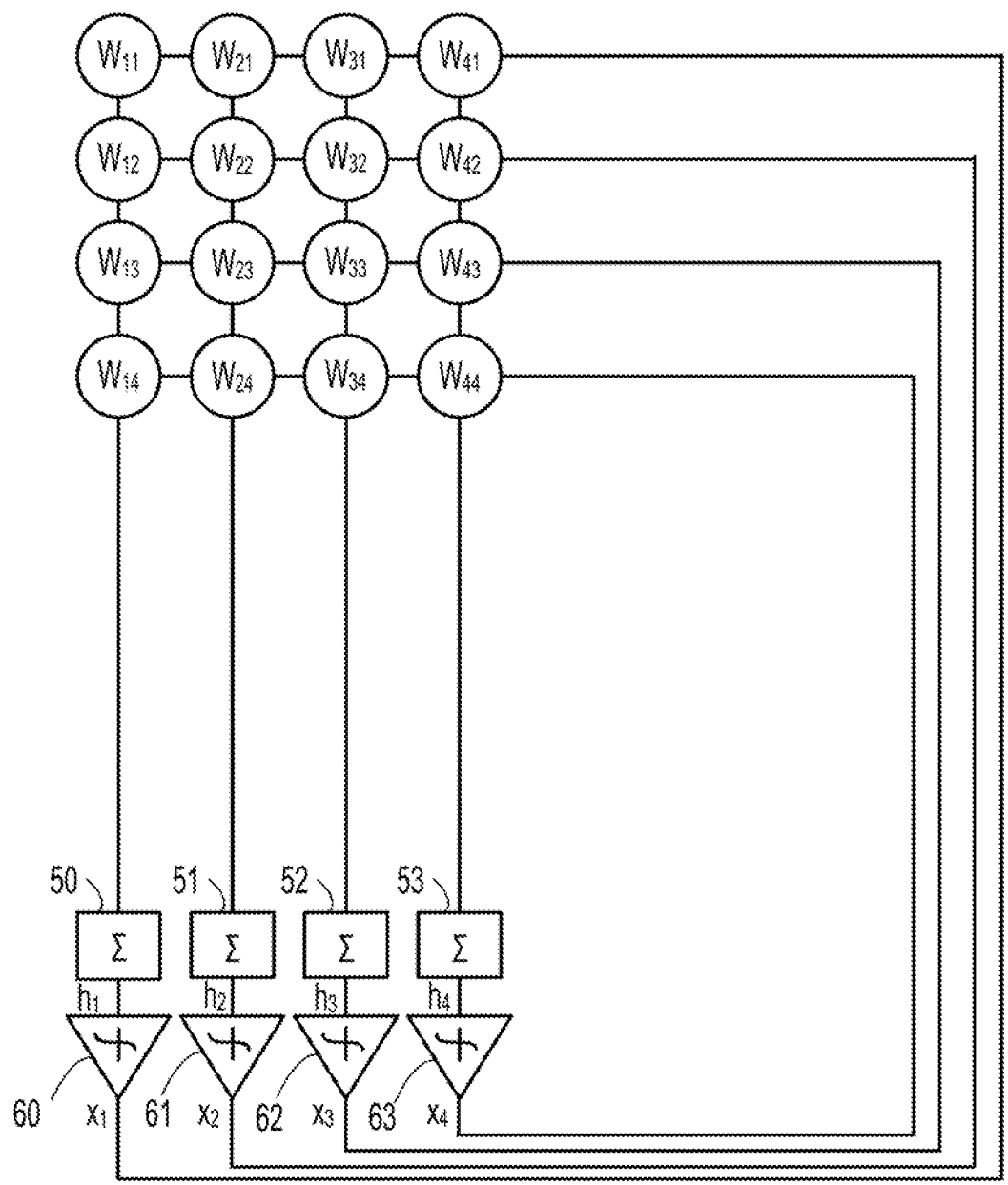
FIG. 8 is a schematic view for explaining an example of an operation state "a"
Figure 9:
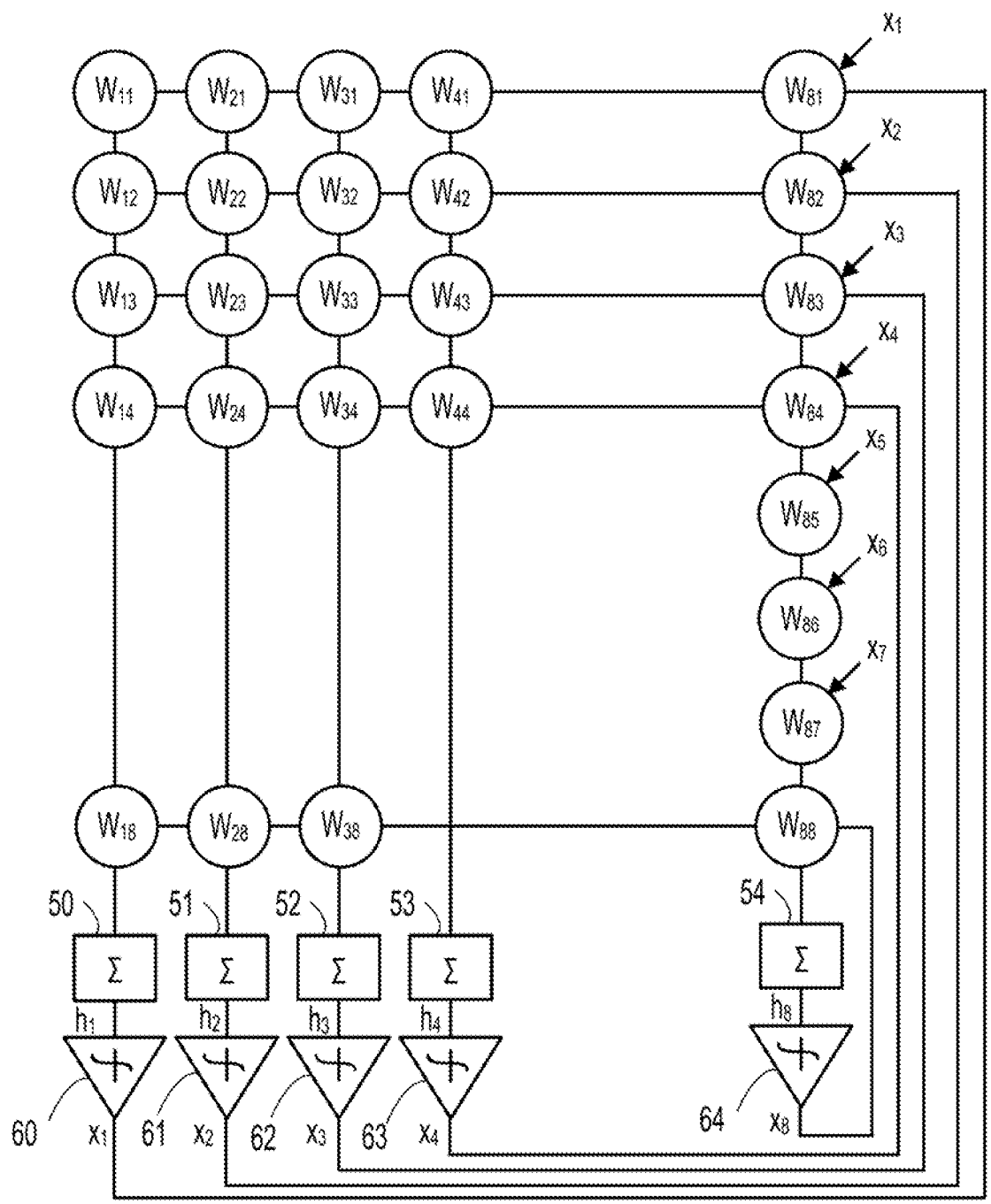
FIG. 9 is a schematic view for explaining an example of operation states "b" to "d"
Figure 10:
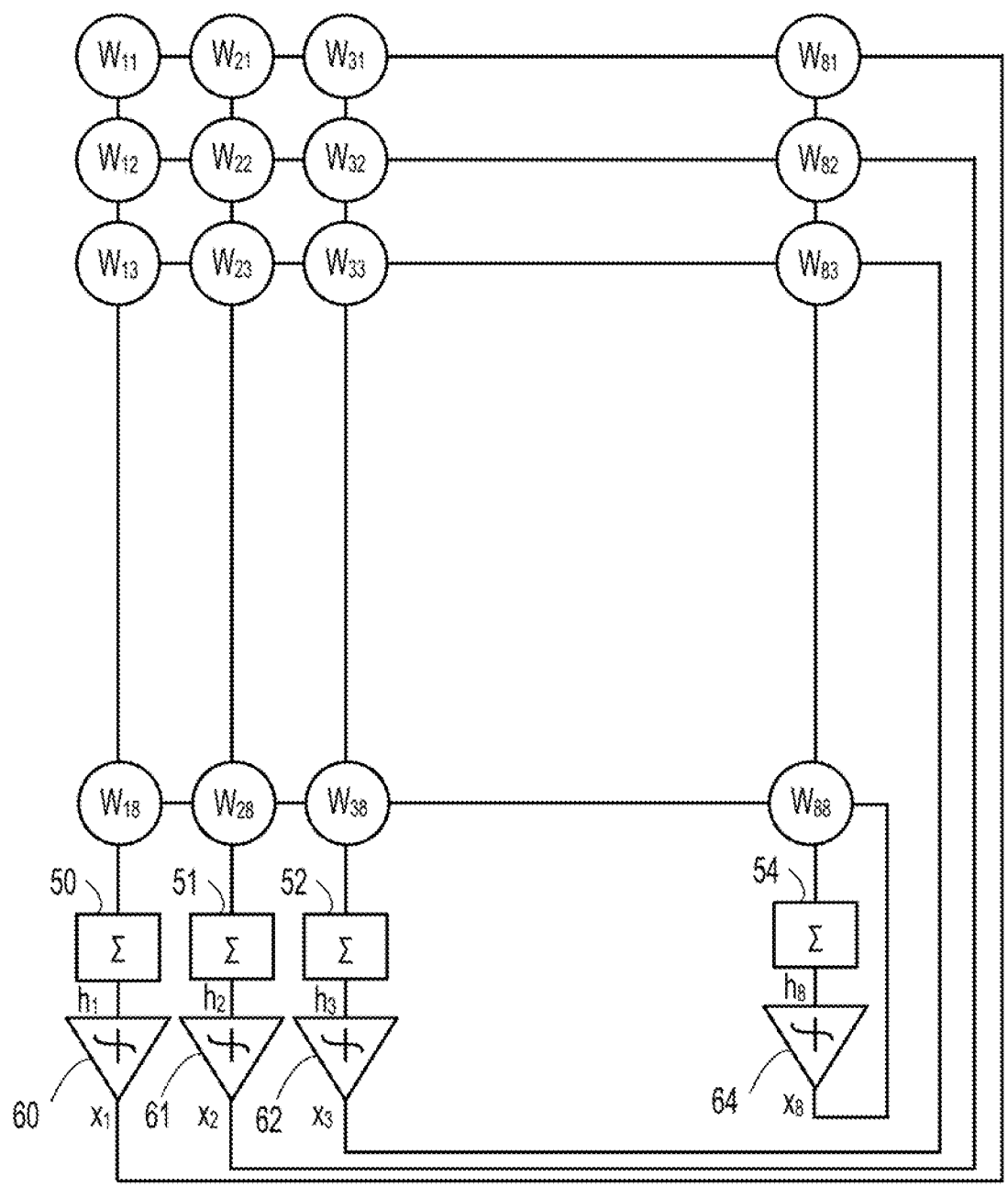
FIG. 10 is a schematic view for explaining an example of an operation state "e".

FIGS. 8, 9, and 10 are schematic views for explaining an example of the operation states "a" to "e."

The integration units 50, 51, 52, 53, and 54 in FIGS. 8 to 10 correspond to, for example, the unit for calculating $h_i$ illustrated in FIG. 5. The determination units 60, 61, 62, 63, and 64 in FIGS. 8 to 10 correspond to, for example, the unit for outputting $x_i$ based on $h_i$ illustrated in FIG. 5. The update neuron selection circuit 22b and so on are not illustrated in FIGS. 8 to 10. In the following description, for the sake of simplicity, it is assumed that the total number of neurons is eight and the number of arithmetic processing circuits 22a1 to 22am is five (m=5).

FIG. 8 is a schematic view or explaining an example of the operation state "a."

In the operation state "a" illustrated in FIG. 8, the iteration operation on four neurons with indexes=1 to 4 corresponding to the neuron A or neuron M in FIG. 7 is being performed. The $h_1$ is updated using $W_{11}$ to $W_{14}$ and $x_1$ to $x_4$, $h_2$ is updated using $W_{21}$ to $W_{24}$ and $x_1$ to $x_4$, $h_3$ is updated using $W_{31}$ to $W_{34}$ and $x_1$ to $x_4$, and $h_4$ is updated using $W_{41}$ to $W_{44}$ and $x_1$ to $x_4$.

FIG. 9 is a schematic view for explaining an example of the operation states "b" to "d."

In the operation state "b," as for $W_{ij}^{(A, K)}$ illustrated in FIG. 7, $W_{18}$, $W_{26}$, and $W_{38}$ are set in an arithmetic processing circuit that is performing the arithmetic process for neurons with indexes=1 to 3. In addition, as for $x_i^{(K)}$ illustrated in FIG. 7, $x_i^{(8)}$ is set in an arithmetic processing circuit that has inactivated the arithmetic process. The $x_i^{(8)}$ includes a bit value (one of $x_1$ to $x_7$) of a neuron updated at the time point of the operation state "b," and $x_8$ for the initial values of the bit values of all neurons or for the bit values of all neurons updated last when the previous neuron of index=8 is processed. Further, as for $W_{ij}^{(K)}$ and $h_K$ illustrated in FIG. 7, $W_{81}$ to $W_{88}$, and $h_8$ are set in an arithmetic processing circuit that has inactivated the arithmetic process.

In the operation state "c," the set $h_8$ is updated in the arithmetic processing circuit that has inactivated the arithmetic process.

In the operation state "d," as $x_i^{(M)}$ and $h_M$ illustrated in FIG. 7, $x_i^{(4)}$ and $h_4$ are stored in the storage unit 21a.

FIG. 10 is a schematic view for explaining an example of the operation state "e."

In the operation state "e" the iteration operation for a neuron with index=4 is inactivated, and the iteration operation for a neuron with index=8 is started. At this time, $h_1$ is updated using $W_{11}$ to $W_{13}$, $W_{18}$, $x_1$ to $x_3$, and $x_8$, $h_2$ is updated using $W_{21}$ to $W_{23}$, $W_{28}$, $x_1$ to $x_3$, and $x_8$, and $h_3$ is updated using $W_{31}$ to $W_{33}$, $W_{38}$, $x_1$ to $x_3$, and $x_8$. $H_8$ is updated using $W_{81}$ to $W_{83}$, $W_{88}$, $x_1$ to $x_3$, and $x_8$.

According to the optimization device 20 of the second embodiment as described above, the same effects as that in the optimization device 10 of the first embodiment may be obtained.

Further, for example, when a process on an inactivated neuron is started (or resumed), the arithmetic processing circuits 22a1 to 22am update the local fields stored in the storage unit 21a using the circuit illustrated in FIG. 5 under the control of the control circuit 21. For example, the initial value of $h_i$ of a neuron with index=i is updated based on the neuron information whose value is updated with respect to the initial values of the bit values of all neurons, and a weighting factor for the neuron with index=i, and a weighting factor for each of all neurons. Alternatively, $h_i$ calculated last before the previous arithmetic process for the neuron with index=i is inactivated is updated based on the neuron information whose value is updated for the bit values of all neurons updated last before the arithmetic process is inactivated, and the above-mentioned weighting factors.

As a result, the bit value of a neuron updated while a process for a certain neuron is being inactivated may be reflected in a local field when the process for that neuron is started (or resumed).

According to an aspect of the embodiments, large-scale arithmetic operations may be implemented with a small amount of hardware.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An optimization device comprising:
   arithmetic processing circuits each configured to:
   hold a bit value of a neuron for which an arithmetic process is to be performed, the neuron being one of neurons of an Ising model obtained by converting an optimization problem of a calculation target; and
   perform the arithmetic process to determine whether to permit updating of the bit value based on a first weighting factor of the Ising model and a first bit value of a target neuron, the first weighting factor of the Ising model indicating a magnitude of interaction between the target neuron and each of the neurons, a total number of the arithmetic processing circuits being smaller than a total number of the neurons;
   a control circuit configured to:
   set, while causing a portion of the arithmetic processing circuits other than a first arithmetic processing circuit among the arithmetic processing circuits to perform the arithmetic process for a partial neuron group that is a portion of the neurons and the arithmetic process of the first arithmetic processing circuit is inactivated, a second bit value of a first neuron among the neurons other than the partial neuron group in the first arithmetic processing circuit;
   cause a second arithmetic processing circuit among the portion of the arithmetic processing circuits to inactivate the arithmetic process; and
   cause the first arithmetic processing circuit to start the arithmetic process for the first neuron; and
   an update neuron selection circuit configured to:
   select the target neuron from one or more update permissible neurons among the partial neuron group, the one or more update permissible neurons being determined to be permitted to be updated; and
   update the first bit value of the target neuron among bit values of neurons held by the portion of the arithmetic processing circuits.

2. The optimization device according to claim 1, wherein the control circuit is configured to cause the second arithmetic processing circuit to inactivate the arithmetic process after storing, in a memory, a local field and last bit values of the neurons, the local field being calculated by the second arithmetic processing circuit last before the second arithmetic processing circuit inactivates the arithmetic process, the last bit values of the neurons being bit values of the neurons updated last before the second arithmetic processing circuit inactivates the arithmetic process.

3. The optimization device according to claim 1, wherein the first arithmetic processing circuit is further configured to start the arithmetic process for the first neuron after updating a local field for the first neuron from an initial bit value based on update information and a second weighting factor, the update information being information of neurons whose bit values are updated from initial bit values, the second weighting factor indicating a magnitude of interaction between the first neuron and each of the neurons.

4. The optimization device according to claim 1, wherein the first arithmetic processing circuit is further configured to resume the arithmetic process for the first neuron after updating, based on update information and a second weighting factor, a local field calculated last before a previous arithmetic process for the first neuron is inactivated, the update information being information of neurons whose bit values are updated from bit values updated last before the previous arithmetic process for the first neuron is inactivated, the second weighting factor indicating a magnitude of interaction between the first neuron and each of the neurons.

5. The optimization device according to claim 1, wherein
  each of the arithmetic processing circuits is further configured to:
    calculate a local field based on the first weighting factor of the Ising model and the first bit value of the target neuron, and
    determine whether to permit updating of the bit value of the neuron based on the local field and the bit value of the neuron.

6. The optimization device according to claim 5, wherein
  each of the arithmetic processing circuits is further configured to:
    update the bit value of the neuron when the local field is less than 0 and the bit value of the neuron is 1, and
    update the bit value of neuron when the local field is greater than 0 and the bit value of the neuron is 0.

7. The optimization device according to claim 1, wherein the update neuron selection circuit is further configured to, when the one or more update permissible neurons is a plurality of update permissible neurons, select the target neuron from the plurality of update permissible neurons based on a random number.

8. A control method of an optimization device, the control method comprising:
  holding, by each of arithmetic processing circuits included in the optimization device, a bit value of a neuron for which an arithmetic process is to be performed, the neuron being one of neurons of an Ising model obtained by converting an optimization problem of a calculation target;
  performing, by each of the arithmetic processing circuits, the arithmetic process to determine whether to permit updating of the bit value based on a first weighting factor of the Ising model and a first bit value of a target neuron, the first weighting factor of the Ising model indicating a magnitude of interaction between the target neuron and each of the neurons, a total number of the arithmetic processing circuits being smaller than a total number of the neurons;
  setting, by a control circuit included in the optimization device, while causing a portion of the arithmetic processing circuits other than a first arithmetic processing circuit among the arithmetic processing circuits to perform the arithmetic process for a partial neuron group that is a portion of the neurons and the arithmetic process of the first arithmetic processing circuit is inactivated, a second bit value of a first neuron among the neurons other than the partial neuron group in the first arithmetic processing circuit;
  causing, by the control circuit, a second arithmetic processing circuit among the portion of the arithmetic processing circuits to inactivate the arithmetic process; and
  causing, by the control circuit, the first arithmetic processing circuit to start the arithmetic process for the first neuron;
  selecting, by an update neuron selection circuit included in the optimization device, the target neuron from one or more update permissible neurons among the partial neuron group, the one or more update permissible neurons being determined to be permitted to be updated; and
  updating, by the update neuron selection circuit, the first bit value of the target neuron among bit values of neurons held by the portion of the arithmetic processing circuits.

* * * * *